US011413923B2

(12) United States Patent
Ishibashi et al.

(10) Patent No.: US 11,413,923 B2
(45) Date of Patent: Aug. 16, 2022

(54) UTILITY VEHICLE

(71) Applicant: KAWASAKI MOTORS, LTD., Akashi (JP)

(72) Inventors: Kazuki Ishibashi, Kobe (JP); Yumi Miyake, Kobe (JP)

(73) Assignee: KAWASAKI MOTORS, LTD., Akashi (JP)

( * ) Notice: Subject to any disclaimer, the term of this patent is extended or adjusted under 35 U.S.C. 154(b) by 294 days.

(21) Appl. No.: 16/808,616

(22) Filed: Mar. 4, 2020

(65) Prior Publication Data

US 2021/0276388 A1 Sep. 9, 2021

(51) Int. Cl.
*B60G 17/019* (2006.01)
*B60G 17/016* (2006.01)
*B60G 3/20* (2006.01)

(52) U.S. Cl.
CPC ... *B60G 17/01908* (2013.01); *B60G 17/0164* (2013.01); *B60G 3/202* (2013.01); *B60G 2200/1322* (2013.01); *B60G 2300/02* (2013.01); *B60G 2400/10* (2013.01)

(58) Field of Classification Search
CPC .......... B60G 17/01908; B60G 17/0164; B60G 3/202; B60G 2200/1322; B60G 2300/02; B60G 2400/10

USPC ................. 280/124.128, 124.134, 124.135
See application file for complete search history.

(56) References Cited

U.S. PATENT DOCUMENTS

| 4,722,546 A * | 2/1988 | Asami ............... B60G 17/0165 280/5.517 |
| 6,053,509 A * | 4/2000 | Izawa ............... B60G 17/016 280/5.52 |
| 7,383,108 B1 * | 6/2008 | Curnutt .............. B60T 8/185 188/297 |
| 8,613,336 B2 | 12/2013 | Deckard et al. |
| 2008/0079280 A1 * | 4/2008 | Nakamura ........... F16F 9/0472 296/35.3 |
| 2010/0032913 A1 * | 2/2010 | Kim ................... B60G 21/0558 280/5.509 |
| 2019/0102959 A1 * | 4/2019 | Saylor ................. G07C 5/0825 |
| 2020/0089250 A1 * | 3/2020 | Marble ................ B60Q 9/00 |

* cited by examiner

*Primary Examiner* — Toan C To
(74) *Attorney, Agent, or Firm* — Alleman Hall Creasman & Tuttle LLP

(57) ABSTRACT

A utility vehicle includes a wheel, a vehicle body frame supported by the wheel, a suspension device connecting the wheel to the vehicle body frame, and an acceleration sensor mounted on the suspension device. The suspension device includes: a below-shock absorber member including an arm swingably connecting the wheel to the vehicle body frame; and a shock absorber connecting the below-shock absorber member to the vehicle body frame. The acceleration sensor is mounted on the arm.

10 Claims, 7 Drawing Sheets

US 11,413,923 B2

UTILITY VEHICLE

BACKGROUND OF THE INVENTION

1. Field of the Invention

The present disclosure relates to a utility vehicle configured to travel on uneven terrains.

2. Description of the Related Art

U.S. Pat. No. 8,613,336 discloses a utility vehicle intended for travel such as that on uneven terrains. When such a utility vehicle is traveling on a bad road, the utility vehicle is subjected to varying degrees of shock applied from the road surface and undergoes irregular vibrations. This is likely to cause the occupant to feel uncomfortable.

A possible approach for improving the ride comfort of a utility vehicle is to mount an acceleration sensor on the vehicle body and control the behavior of the vehicle body based on detection signals of the acceleration sensor. Another possible approach is to record detection signals of the acceleration sensor in the form of a data log and use information obtained from the data log for designing in the future.

SUMMARY OF THE INVENTION

A utility vehicle according to one aspect of the present disclosure includes: a wheel; a vehicle body frame supported by the wheel; a suspension device connecting the wheel to the vehicle body frame; and an acceleration sensor mounted on the suspension device, wherein the suspension device includes: a below-shock absorber member including an arm swingably connecting the wheel to the vehicle body frame; and a shock absorber connecting the below-shock absorber member to the vehicle body frame, and the acceleration sensor is mounted on the arm. The "below-shock absorber member" may be any member of the suspension device that is other than the shock absorber and that connects the wheel to the vehicle body frame.

In the above configuration, shock applied from the road surface to the wheel during travel on a bad road is detected before being absorbed by the shock absorber. As such, a detection delay before detection of the acceleration of the applied shock is reduced, and thus the responsiveness and accuracy of control performed in response to the shock applied to the wheel can be improved. Additionally, when detection signals of the acceleration sensor are recorded in the form of a data log, the acceleration at a location close to the wheel can be recorded, and the shock actually applied to the wheel can be sensed with a reduced time lag.

The above and further objects, features and advantages of the present disclosure will be more apparent from the following detailed description of preferred embodiments with reference to the accompanying drawings.

DETAILED DESCRIPTION OF THE EMBODIMENTS

Hereinafter, an embodiment will be described with reference to the drawings.

Figure 1:
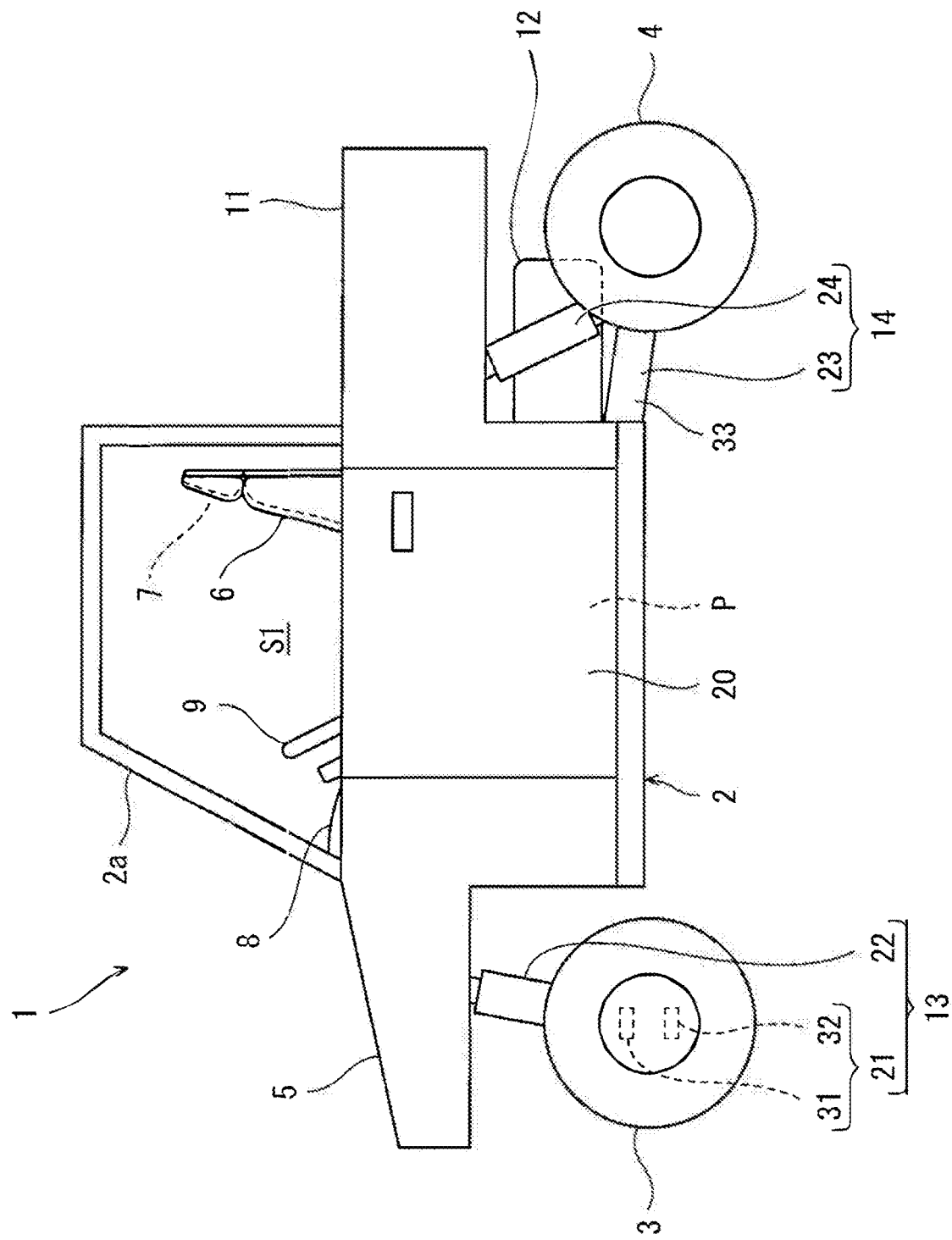
FIG. 1 is a schematic left side view of a utility vehicle according to an embodiment.

FIG. 1 is a left side view schematically showing a utility vehicle 1 according to the embodiment. As shown in FIG. 1, the utility vehicle 1 includes a vehicle body frame 2, a pair of left and right front wheels 3 supporting a front portion of the vehicle body frame 2, and a pair of left and right rear wheels 4 supporting a rear portion of the vehicle body frame 2. The tires of the front and rear wheels 3 and 4 are balloon tires for travel on uneven terrains. The space between the left and right front wheels 3 is covered from above by a hood 5 made of resin. A driver seat 6 and a passenger seat 7 supported by the vehicle body frame 2 are disposed rearward of the hood 5 and arranged side-by-side.

The vehicle body frame 2 is a pipe frame constituted by a plurality of pipes connected together. The vehicle body frame 2 includes a cabin frame 2a surrounding a vehicle interior space S1 in which the driver seat 6 and the passenger seat 7 are disposed. On the left of the driver seat 6 there is provided a driver seat-side boarding opening P closable by a side door 20. Likewise, on the right of the passenger seat 7 there is provided a passenger seat-side boarding opening closable by a side door. The vehicle interior space S1 surrounded by the cabin frame 2a is exposed to the outside environment. A dash panel 8 is disposed forward of the driver seat 6 and the passenger seat 7. A handle device 9 is mounted on the dash panel 8 and projects toward the driver seat 6.

A loading bed 11 forming a recessed loading space open to the outside environment is disposed rearward of the cabin frame 2a. A power unit 12 is mounted below the loading bed 11. The power unit 12 includes an engine configured as an internal combustion engine and a continuously variable transmission configured to change the speed of rotation produced by rotational power output from the engine. An electric motor may be used as a prime mover instead of the engine. The power unit 12 generates rotational power for driving drive wheels. When the utility vehicle 1 is a two-wheel-drive vehicle, the rear wheels 4 are the drive wheels. When the utility vehicle 1 is a four-wheel-drive vehicle, the front and rear wheels 3 and 4 are the drive wheels.

Each of the pair of front wheels 3 is connected to the vehicle body frame 2 via a front electronically controlled suspension device 13. The front electronically controlled suspension device 13 includes a front arm mechanism 21 and a front shock absorber 22. The front arm mechanism 21 connects the front wheel 3 to the vehicle body frame 2 in such a manner that the front wheel 3 is movable up and down relative to the vehicle body frame 2. Specifically, the front arm mechanism 21 includes an upper A-arm 31 and a lower A-arm 32 disposed below the upper A-arm 31.

The front shock absorber 22 has spring properties and damper properties and connects the front arm mechanism 21 to the vehicle body frame 2. The front shock absorber 22 is a known active shock absorber. Active shock absorbers are configured such that their extension-compression stroke and/or damping coefficient is variable by electronic control. In an example, the front shock absorber 22 is configured such that its damping coefficient is variable by electronic control. Specifically, the damping coefficient is varied by actuating a solenoid valve (not illustrated) of the front shock absorber 22.

Each of the pair of rear wheels 4 is connected to the vehicle body frame 2 via a rear electronically controlled suspension device 14. The rear electronically controlled suspension device 14 includes a rear arm mechanism 23 and a rear shock absorber 24. The rear arm mechanism 23 connects the rear wheel 4 to the vehicle body frame 2 in such a manner that the rear wheel 4 is movable up and down relative to the vehicle body frame 2. Specifically, the rear arm mechanism 23 includes a trailing arm 33 extending in the front-rear direction.

The rear shock absorber 24 has spring properties and damper properties and connects the rear arm mechanism 23 to the vehicle body frame 2. Similarly to the front shock absorber 22, the rear shock absorber 24 is a known active shock absorber. Active shock absorbers are configured such that their extension-compression stroke and/or damping coefficient is variable by electronic control. In an example, the rear shock absorber 24 is configured such that its damping coefficient is variable by electronic control. The electronically controlled suspension may be employed only in the front suspension or rear suspension.

Figure 2:
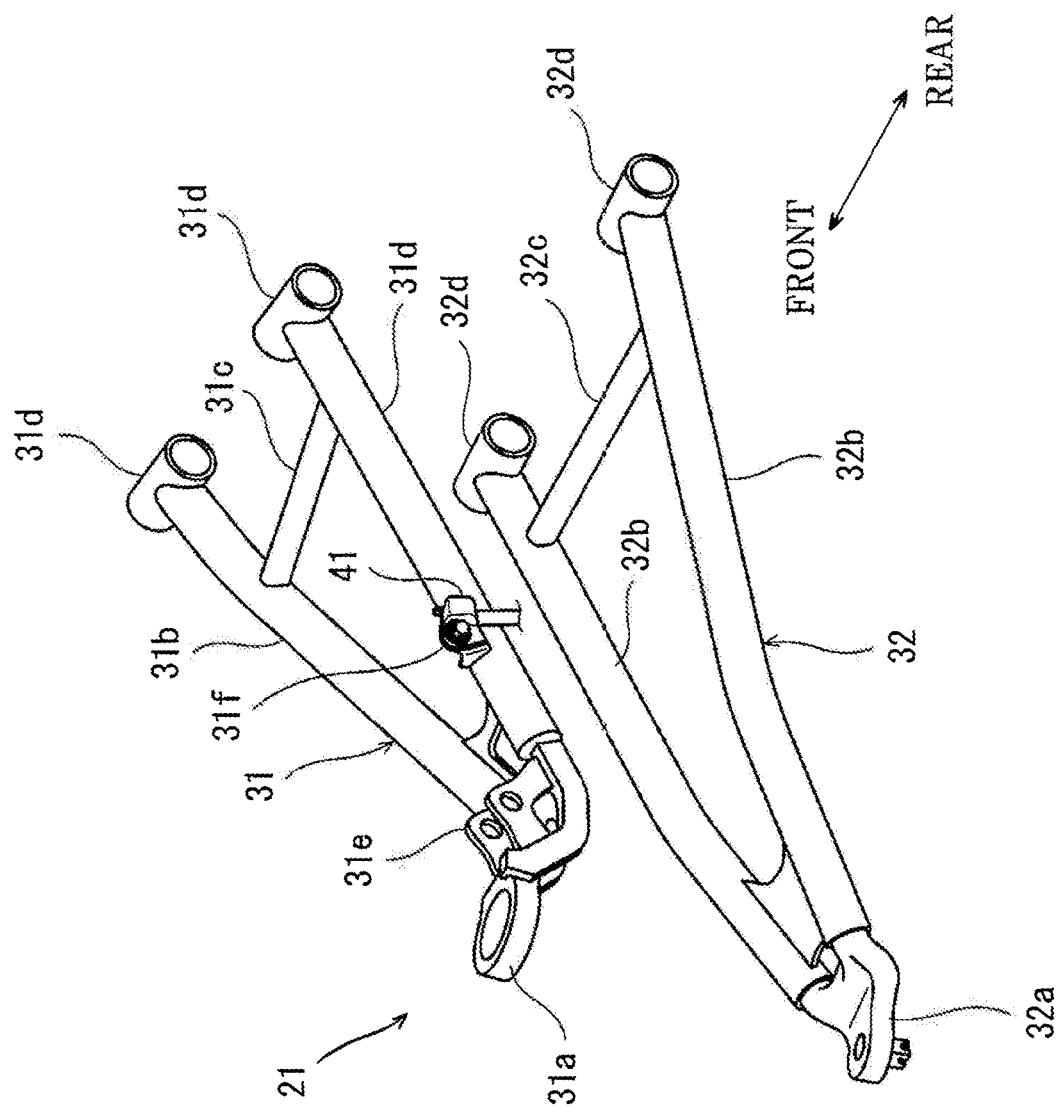
FIG. 2 is a top rear perspective view of a front electronically controlled suspension device and a front acceleration sensor of the utility vehicle of FIG. 1.
Figure 3:
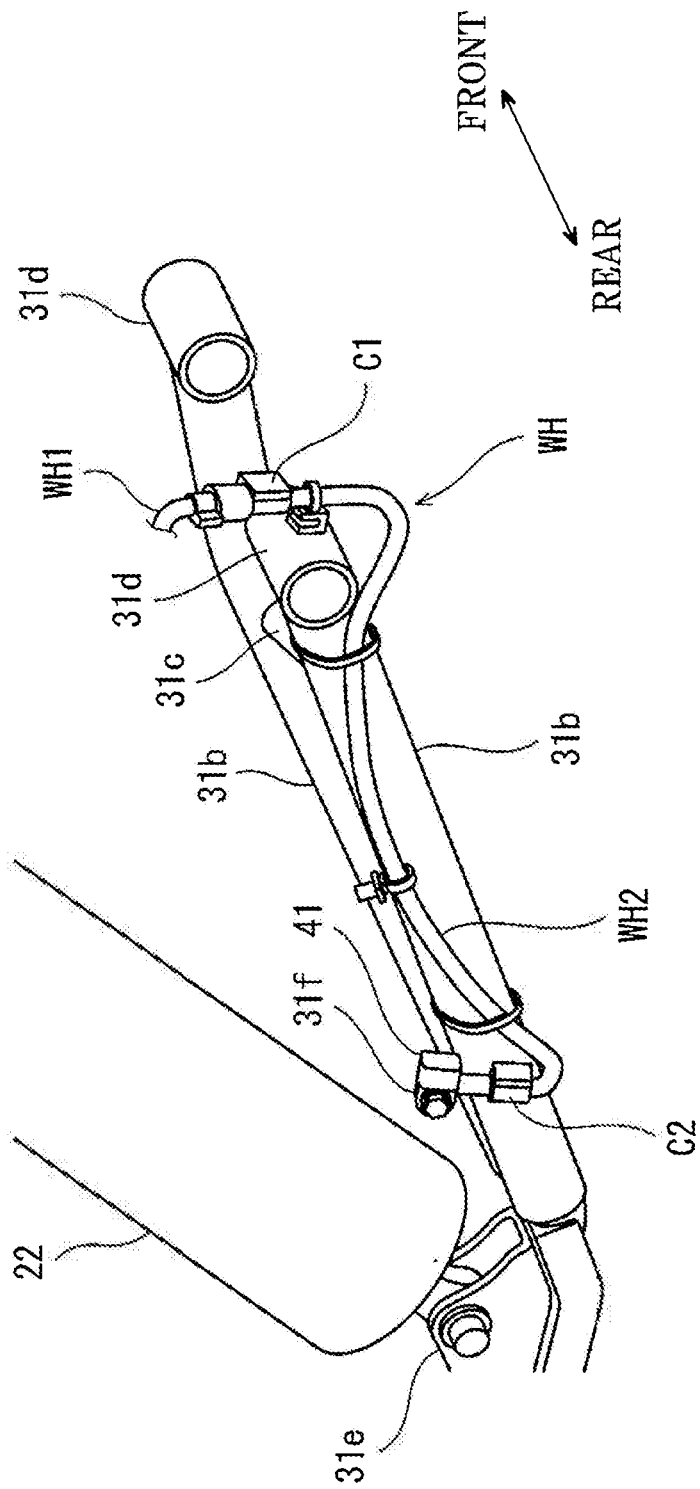
FIG. 3 is a rear perspective view of the front electronically controlled suspension device and front acceleration sensor of FIG. 2.
Figure 4:
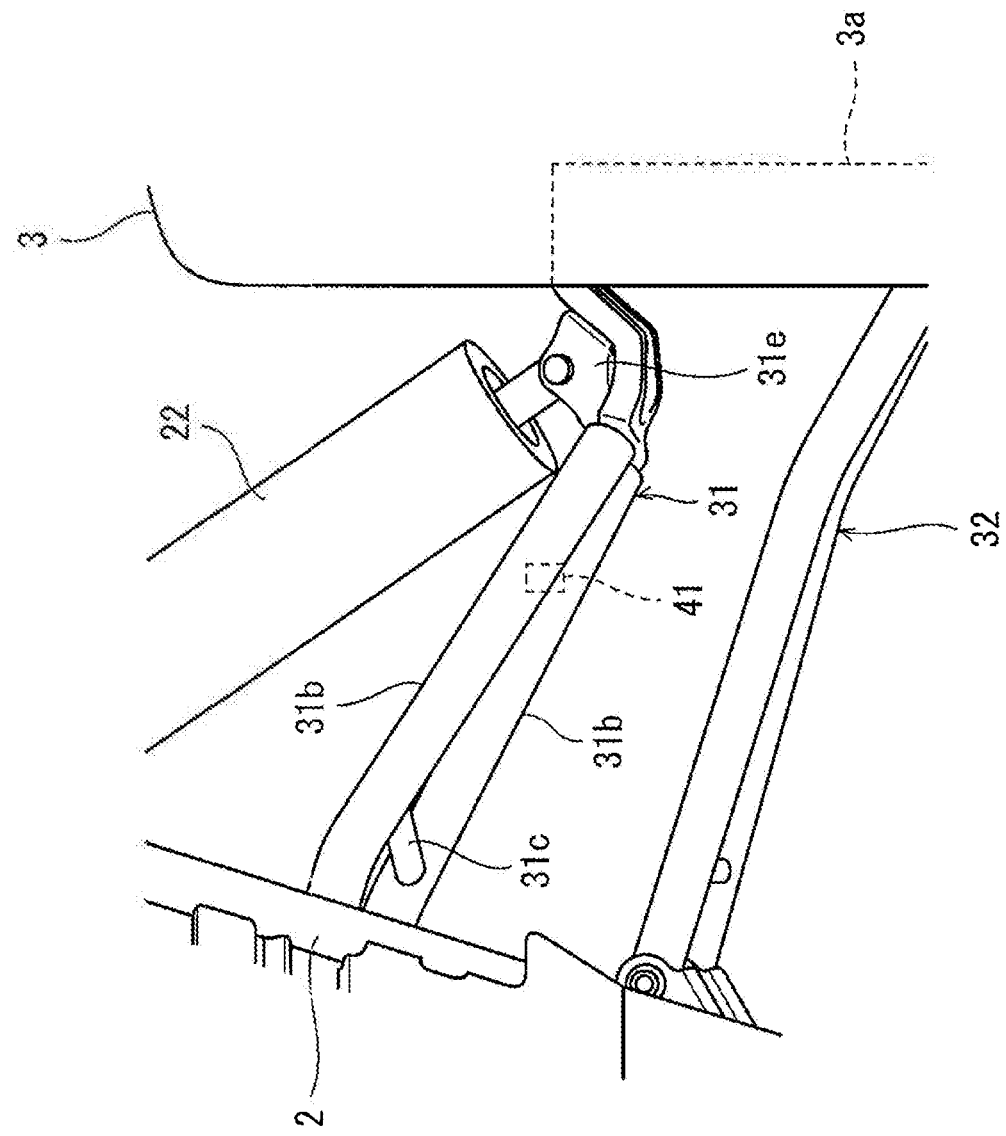
FIG. 4 is a front view of the front electronically controlled suspension device and front acceleration sensor of FIG. 3.

FIG. 2 is a top rear perspective view of the front electronically controlled suspension device 13 and a front acceleration sensor 41 of the utility vehicle 1 of FIG. 1. FIG. 3 is a rear perspective view of the front electronically controlled suspension device 13 and front acceleration sensor 41 of FIG. 2. FIG. 4 is a front view of the front electronically controlled suspension device 13 and front acceleration sensor 41 of FIG. 3. As shown in FIG. 2, the front arm mechanism 21 includes the upper A-arm 31 and the lower A-arm 32 which are A-shaped in plan view. The upper A-arm 31 includes a front wheel connection portion 31a, a pair of arm portions 31b, a bridge portion 31c, a pair of frame connection portions 31d, an absorber connection portion 31e, and a sensor mounting portion 31f.

As shown in FIGS. 2 to 4, the front wheel connection portion 31a is connected to the front wheel 3 (for example, to a knuckle 3a rotatably supporting the wheel hub). The arm portions 31b extend from the front wheel connection portion 31a in such a manner that the distance between the arm portions 31b in the vehicle front-rear direction gradually increases. The bridge portion 31c connects the respective middle portions of the arm portions 31b. The frame connection portions 31d are respectively provided at those ends of the arm portions 31b which are closer to the vehicle body frame 2 than the opposite ends.

The frame connection portions 31d are connected to the front frame portion of the vehicle body frame 2 (see FIG. 1) in such a manner that the A-arm is pivotable about an axis extending in the vehicle front-rear direction. The absorber connection portion 31e is disposed at a location such that the absorber connection portion 31e overlaps the front wheel 3 in a side view of the vehicle. Specifically, the absorber connection portion 31e is disposed between the front wheel connection portion 31a and the arm portions 31b. To the absorber connection portion 31e is coupled the lower end of the front shock absorber 22. The sensor mounting portion 31f is provided on the rear one of the pair of arm portions 31b. The sensor mounting portion 31f is located closer to the front wheel 3 than is the longitudinal center of the rear arm portion 31b.

The lower A-arm 32 includes a front wheel connection portion 32a, a pair of arm portions 32b, a bridge portion 32c, and a pair of frame connection portions 32d. The configurations of the front wheel connection portion 32a, arm portions 32b, bridge portion 32c, and frame connection portions 32d are substantially the same as the configurations of the front wheel connection portion 31a, arm portions 31b, bridge portion 31c, and frame connection portions 31d.

The front shock absorber 22 is disposed between the upper A-arm 31 and the vehicle body frame 2. The upper A-arm 31 is an exemplary below-shock absorber member having the absorber connection portion 31e to which the lower end of the front shock absorber 22 is connected. The upper A-arm 31 is a below-shock absorber member located upstream of the front shock absorber 22 in the direction of shock propagation from the front wheel 3 to the vehicle body frame 2. That is, the upper A-arm 31 is a member to which shock applied to the front wheel 3 from the road surface is transmitted before being transmitted to the front shock absorber 22.

The below-shock absorber member may be a member other than an arm and may be, for example, a knuckle. Nevertheless, mounting of the acceleration sensor on an arm has an advantage over mounting of the acceleration sensor on another member such as a knuckle in that when shock is applied, the acceleration sensor exhibits motion in the vehicle height direction as a dominant behavior and avoids being disturbed by irrelevant noise. The below-shock absorber member may be a linkage member in the form of an arm which is movable relative to the vehicle body frame 2 upon application of shock from the road surface to the front wheel 3. For example, the below-shock absorber member may be the lower A-arm 32.

In the upper A-arm 31, the front acceleration sensor 41 is mounted at the sensor mounting portion 31f. Shock applied to the front wheel 3 is transmitted from the upper A-arm 31 directly to the front acceleration sensor 41. That is, shock applied to the front wheel 3 is transmitted to the front acceleration sensor 41 before being absorbed by the front shock absorber 22.

The front acceleration sensor 41 is disposed at a rearward location on the upper A-arm 31. Specifically, the front acceleration sensor 41 is disposed rearward of a center line of the rear arm portion 31b, the center line extending in the direction in which the rear arm portion 31b extends. The front acceleration sensor 41 is disposed above that center line of the rear arm portion 31b which extends in the direction in which the rear arm portion 31b extends. The front acceleration sensor 41 may be disposed rearward of the front arm portion 31b and forward of the rear arm portion 31b.

As shown in FIG. 4, the front acceleration sensor 41 in front view (as viewed from the front of the vehicle) is hidden by the upper A-arm 31. Specifically, in front view, the front arm portion 31b of the upper A-arm 31 overlaps the rear arm portion 31b, and the location of the front arm portion 31b is slightly different from that of the rear arm portion 31b in the vehicle height direction. In front view, the front acceleration sensor 41 is veiled by the front arm portion 31b and the rear arm portion 31b. That is, in front view, a lower portion of the front acceleration sensor 41 is hidden by the rear arm portion 31b and the rest of the front acceleration sensor 41 is hidden by the front arm portion 31b. The front acceleration sensor 41 in front view only has to be hidden by the upper A-arm 31. In front view, the entire front arm portion 31b may coincide with the rear arm portion 31b. The front acceleration sensor 41 may be mounted on the lower A-arm 32 serving as a below-shock absorber member. Nevertheless, mounting of the acceleration sensor on the upper A-arm has an advantage in that the acceleration sensor can be disposed at a greater distance from the road surface to reduce the influence of flying stones or mud on the acceleration sensor.

As shown in FIG. 3, a wire harness WH is electrically connected to the front acceleration sensor 41. The wire harness WH includes a main harness WH1, a sub-harness WH2, and a connector device C1. The main harness WH1 is attached to the vehicle body frame 2. The sub-harness WH2 electrically connects the main harness WH1 to the front acceleration sensor 41. The connector device C1 detachably connects the sub-harness WH2 to the main harness WH1. The sub-harness WH2 is detachably connected to the front acceleration sensor 41 by a connector device C2.

The sub-harness WH2 is laid along the rear arm portion 31b of the upper A-arm 31. Specifically, the sub-harness WH2 is disposed rearward of the rear arm portion 31b and extends along the rear arm portion 31b. In front view, the sub-harness WH2 is hidden by the upper A-arm 31.

Given portions of the sub-harness WH2 are positionally fixed on the upper A-arm 31 by clamps. The connector device C1 is disposed in the vicinity of the frame connection portion 31d of the upper A-arm 31. The sub-harness WH2 is not connected to the vehicle body frame 2 at any portion other than that where the connector device C1 is disposed. The sub-harness WH2 is separate from the vehicle body frame 2 at all portions other than that where the connector device C1 is disposed.

Figure 5:
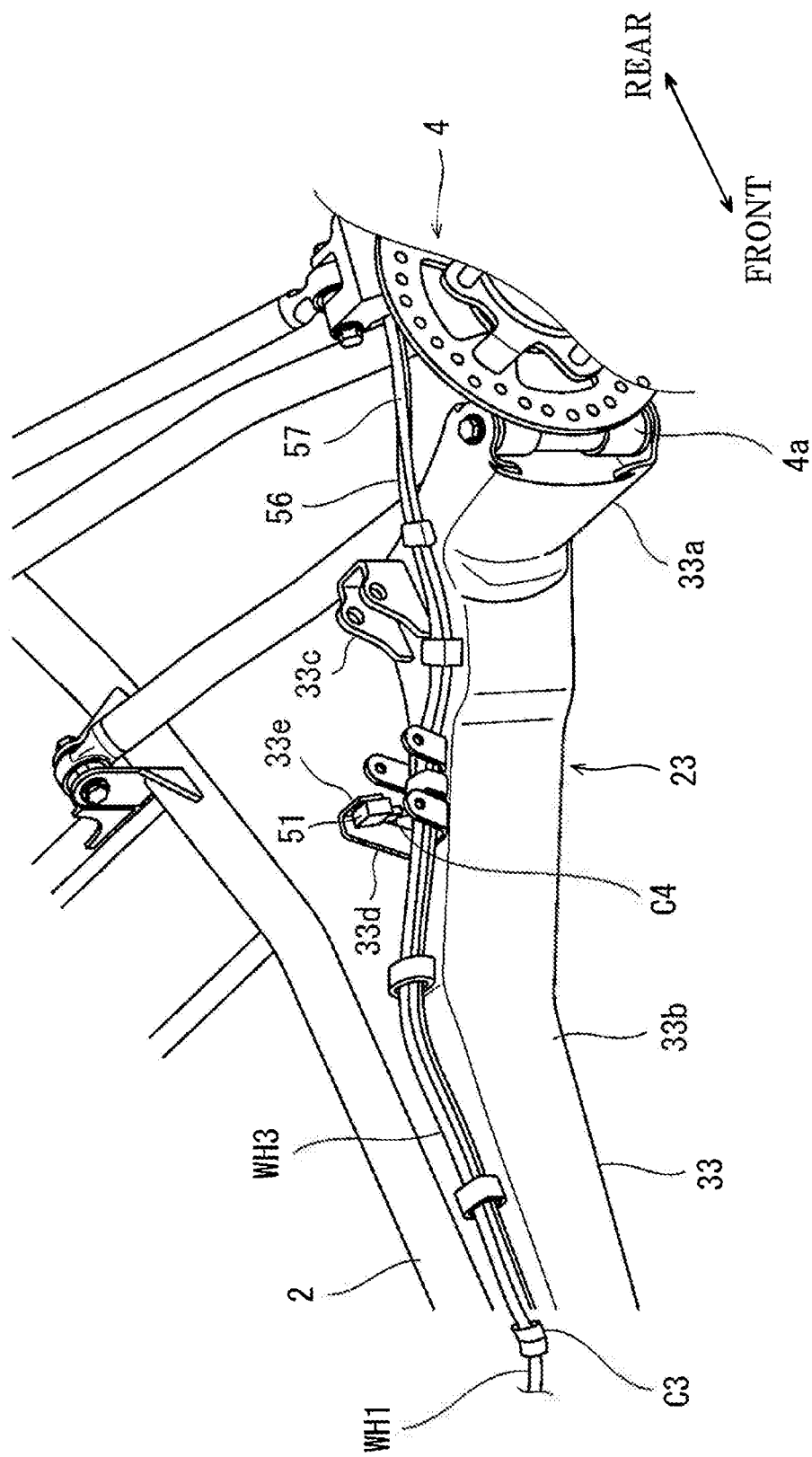
FIG. 5 is a top front perspective view of a rear electronically controlled suspension device and a rear acceleration sensor of the utility vehicle of FIG. 1.
Figure 6:
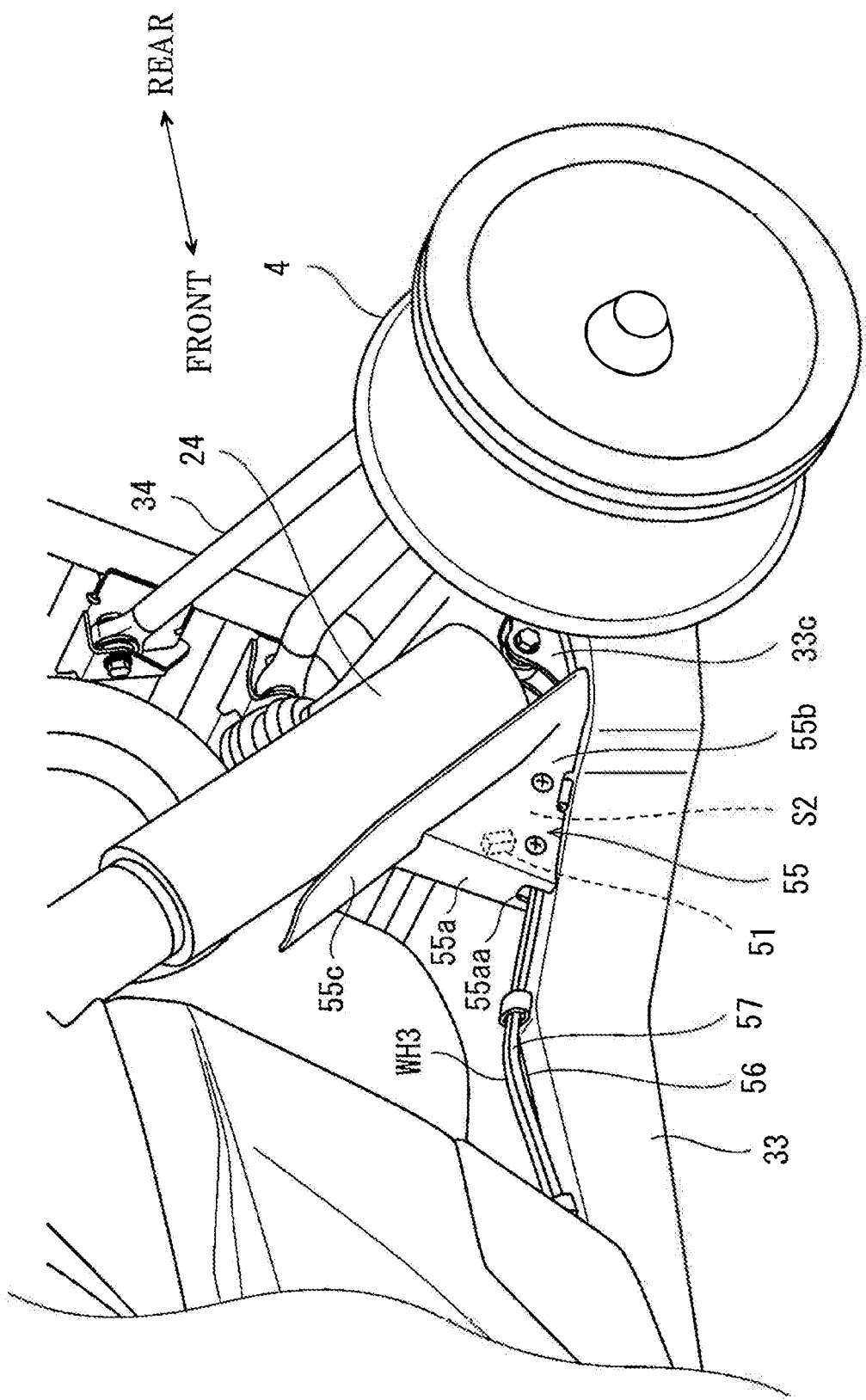
FIG. 6 is a top front perspective view of the rear electronically controlled suspension device and rear acceleration sensor of FIG. 5.

FIG. 5 is a top front perspective view of the rear electronically controlled suspension device 14 and a rear acceleration sensor 51 of the utility vehicle 1 of FIG. 1. FIG. 6 is a top front perspective view of the rear electronically controlled suspension device 14 and rear acceleration sensor 51 of FIG. 5. As shown in FIG. 5, the rear arm mechanism 23 of the rear electronically controlled suspension device 14 includes a trailing arm 33 extending in the front-rear direction. The trailing arm 33 includes a rear wheel connection portion 33a, an arm portion 33b, an absorber connection portion 33c, a guard mounting portion 33d, and a sensor mounting portion 33e.

The rear wheel connection portion 33a is connected to the rear wheel 4 (for example, to a knuckle 4a rotatably supporting the wheel hub). The arm portion 33b extends forward from the rear wheel connection portion 33a. The front end of the arm portion 33b is connected to a base frame portion of the vehicle body frame 2 (see FIG. 1) in such a manner that the arm portion 33b is pivotable about an axis extending in the vehicle front-rear direction. The absorber connection portion 33c is located in the vicinity of the rear wheel connection portion 33a and projects upward from the upper surface of the arm portion 33b. The guard mounting portion 33d is located forward of the absorber connection portion 33c and projects upward from the upper surface of the arm portion 33b. The sensor mounting portion 33e is located in the vicinity of the guard mounting portion 33d. In particular, the sensor mounting portion 33e projects from the guard mounting portion 33d. The sensor mounting portion 33e is located closer to the rear wheel 4 than is the longitudinal center of the trailing arm 33.

As shown in FIGS. 5 and 6, the rear shock absorber 24 is disposed between the trailing arm 33 and the vehicle body frame 2. The trailing arm 33 is an exemplary below-shock absorber member having the absorber connection portion 33c to which the lower end of the rear shock absorber 24 is connected. The trailing arm 33 is a below-shock absorber member located upstream of the rear shock absorber 24 in the direction of shock propagation from the rear wheel 4 to the vehicle body frame 2. That is, the trailing arm 33 is a member to which shock applied from the road surface to the rear wheel 4 is transmitted before being transmitted to the rear shock absorber 24.

The below-shock absorber member may be a member other than an arm, and may be a linkage member in the form of an arm which is movable relative to the vehicle body frame 2 upon application of shock from the road surface to the rear wheel 4. For example, the below-shock absorber member may be a link arm 34 connecting the rear wheel 4 to the vehicle body frame 2.

In the trailing arm 33, a guard member 55 is mounted at the guard mounting portion 33d. The guard member 55 is, for example, formed of resin by integral molding. The guard member 55 covers the front side of a lower portion of the rear shock absorber 24. The guard member 55 includes a front wall portion 55a, a pair of side wall portions 55b, and a flange portion 55c. The front wall portion 55a faces forward and is provided with a cut 55aa at its lower portion. The side wall portions 55b extend rearward from the left and right ends of the front wall portion 55a, respectively.

The upper end of the front wall portion 55a and the rear ends of the side wall portions 55b are located forward of the rear shock absorber 24. The flange portion 55c is in the form of a flange projecting from the upper end of the front wall portion 55a and the rear ends of the side wall portions 55b, and faces the front side of the rear shock absorber 24. The guard member 55 prevents external foreign matter (such as flying stones, mud, and tree branches) from reaching the rear shock absorber 24.

In the trailing arm 33, the rear acceleration sensor 51 is mounted at the sensor mounting portion 33e. Shock applied to the rear wheel 4 is transmitted from the trailing arm 33 directly to the rear acceleration sensor 51. That is, shock applied to the rear wheel 4 is transmitted to the rear acceleration sensor 51 before being absorbed by the rear shock absorber 24.

The rear acceleration sensor 51 is disposed on the upper side of the trailing arm 33, and is hidden by the trailing arm 33 when viewed from below. The rear acceleration sensor 51 is hidden by the guard member 55 when viewed from the front of the vehicle and when viewed in the vehicle width direction. The rear acceleration sensor 51 is disposed within a space S2 defined by the front wall portion 55a of the guard member 55, the pair of side wall portions 55b of the guard member 55, the upper surface of the trailing arm 33, and the front surface of the rear shock absorber 24. The rear acceleration sensor 51 may be mounted on a linkage member 34 serving as a below-shock absorber member.

The wire harness WH is electrically connected to the rear acceleration sensor 51. The wire harness WH includes the main harness WH1, a sub-harness WH3, and a connector device C3. The main harness WH1 is attached to the vehicle body frame 2. The sub-harness WH3 electrically connects the main harness WH1 to the rear acceleration sensor 51. The connector device C3 detachably connects the sub-harness WH3 to the main harness WH1. The sub-harness WH3 is detachably connected to the rear acceleration sensor 51 by a connector device C4.

The sub-harness WH3 is laid along the upper surface of the trailing arm 33 and extends from the front end of the trailing arm 33 toward the rear acceleration sensor 51. A brake hose 56 and a brake cable 57 are laid along the upper surface of the trailing arm 33 and extend from the front end of the trailing arm 33 toward the rear wheel 4. The brake hose 56 and brake cable 57 are guided by the guard mounting portion 33d and prevented by the guard mounting portion 33d from lying outward of the upper surface of the trailing arm 33 in the leftward/rightward direction.

The sub-harness WH3, brake hose 56, and brake cable 57 are bundled together, and given portions of the bundle are positionally fixed on the trailing arm 33 by clamps. The bundle extends through the cut 55aa of the front wall portion 55a of the guard member 55 in the front-rear direction. The connector device C3 is located in the vicinity of the front end of the trailing arm 33. The sub-harness WH3 is not connected to the vehicle body frame 2 at any portion other than that where the connector device C3 is disposed. The sub-harness WH3 is separate from the vehicle body frame 2 at all portions other than that where the connector device C3 is disposed.

Figure 7:
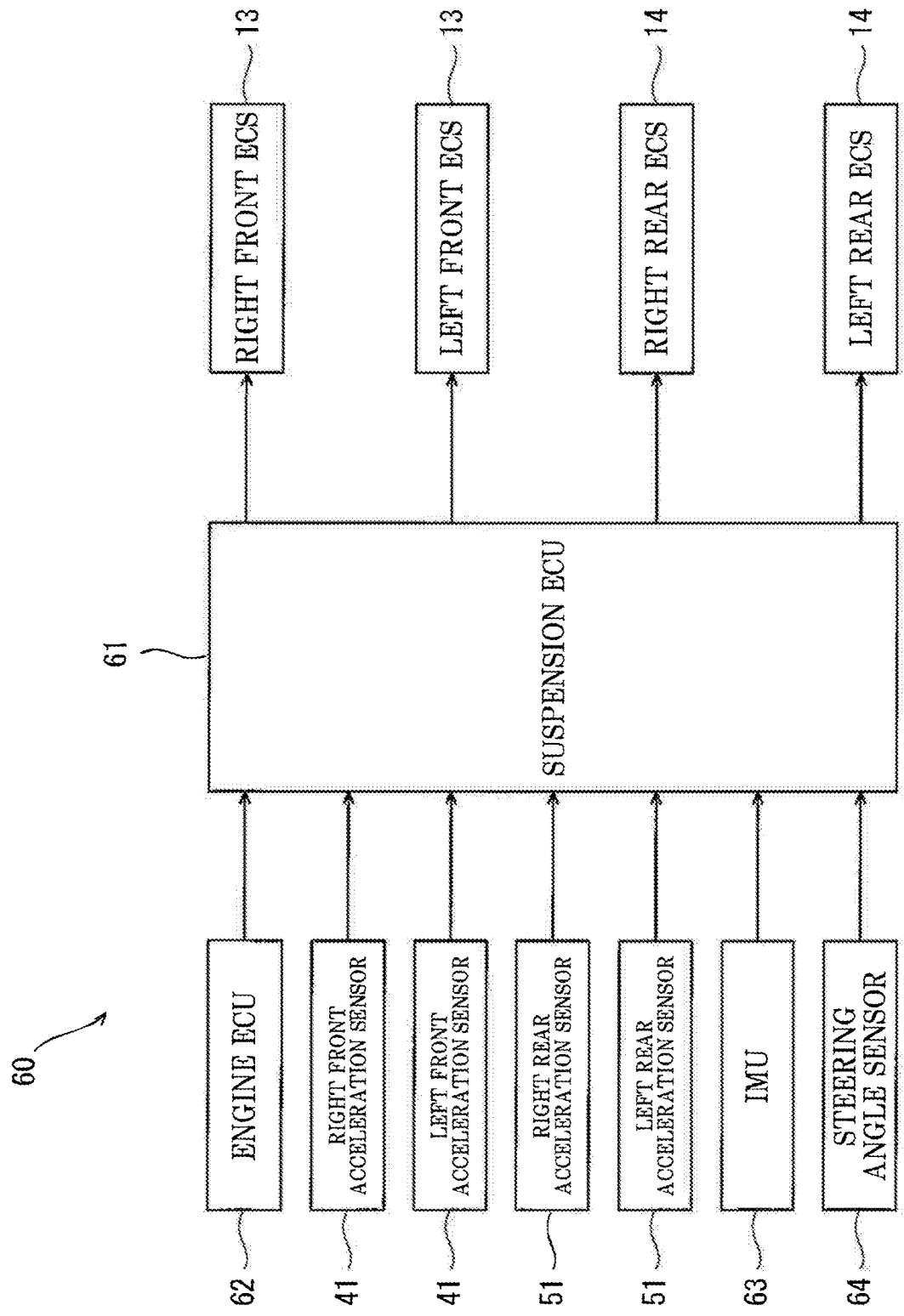
FIG. 7 is a block diagram of an electronically controlled suspension system of the utility vehicle of FIG. 1.

FIG. 7 is a block diagram of an electronically controlled suspension system 60 of the utility vehicle 1 of FIG. 1. As shown in FIG. 7, the electronically controlled suspension system includes an electronic control unit 61, to the input of which are connected an engine ECU 62, the pair of front acceleration sensors 41, the pair of rear acceleration sensors 51, an inertial measurement unit (IMU) 63, and a steering angle sensor 64. To the output of the electronic control unit 61 are connected the pair of front electronically controlled suspension devices (ECSs) 13 and the pair of rear electronically controlled suspension devices (ECSs) 14. The electronic control unit 61 includes a processor, a volatile memory, a non-volatile memory, and an I/O interface as hardware components.

The engine ECU 62 receives various information such as the vehicle speed, gear position, and throttle position in order to control the amount of air taken into the engine, the amount of fuel to be injected, and the timing of ignition. The engine ECU 62 sends the information such as the vehicle speed, gear position, and throttle position to the electronic control unit 61. The front acceleration sensors 41 detect the accelerations of the front arm mechanisms 21 linked to the front wheels 3. The rear acceleration sensors 51 detect the accelerations of the rear arm mechanisms 23 linked to the rear wheel 4.

The IMU 63 is secured to the vehicle body frame 2, and detects the acceleration of the vehicle body frame 2 in a plurality of directions. A common acceleration sensor may be mounted on the vehicle body frame 2 instead of the IMU 63. The steering angle sensor 64 detects the steering angle of the handle device 9. The electronic control unit 61 controls the front electronically controlled suspension devices 13 and rear electronically controlled suspension devices 14 to reduce the acceleration of the vehicle body frame 2 based on signals input from the engine ECU 62, the acceleration sensors 41 and 51, the IMU 63, and the steering angle sensor 64. That is, the electronic control unit 61 controls the suspension devices 13 and 14 with reference to both the acceleration of the vehicle body frame 2 and the acceleration of the below-shock absorber member. The detection signals of the acceleration sensors 41 and 51 may be recorded in the form of a data log in the electronic control unit 61 or another storage device.

In the configuration described above, shock applied from the road surface to the front wheels 3 and/or rear wheels 4 during travel on a bad road is detected by the acceleration sensors 41 and/or 51 before being absorbed by the shock absorbers. As such, a detection delay before detection of the acceleration of the shock is reduced, and thus the responsiveness and accuracy of control performed in response to the shock applied to the front wheels 3 and/or rear wheels 4 can be improved. Additionally, when detection signals of the acceleration sensors 41 or 51 are recorded in the form of a data log, the accelerations at locations close to the front wheels 3 or rear wheels 4 can be recorded, and the shock actually applied to the font wheels 3 or rear wheels 4 can be sensed with a reduced time lag.

Additionally, since each front acceleration sensor 41 is secured to the upper A-arm 31 to which the lower end of the front shock absorber 22 is connected, a response delay occurring when the front acceleration sensor 41 provides an output in response to application of shock to the front shock absorber 22 through the front wheel 3 is reduced. Likewise, since each rear acceleration sensor 51 is secured to the trailing arm 33 to which the lower end of the rear shock absorber 24 is connected, a response delay occurring when the rear acceleration sensor 51 provides an output in response to application of shock to the rear shock absorber 24 through the rear wheel 4 is reduced. Thus, the electronic control unit 61 can sense the shock quickly based on detection signals of the front acceleration sensor 41 and rear acceleration sensor 51 before sensing the shock-induced motion of the vehicle body frame 2 based on a detection signal of the IMU 63.

Additionally, since the front acceleration sensor 41 is mounted on the upper A-arm 31, the front acceleration sensor 41 is farther from the road surface and less likely to be hit by foreign matter coming from below during travel on a bad road than when the front acceleration sensor 41 is mounted on the lower A-arm 32. Additionally, since the front acceleration sensor 41 is disposed at a rearward location on the upper A-arm 31 and is hidden by the upper A-arm 31 in front view, the front acceleration sensor 41 can be prevented from being hit by foreign matter coming from the front during travel on a bad road.

Additionally, since the rear acceleration sensor 51 is disposed on the upper side of the trailing arm 33 and is hidden by the trailing arm 33 when viewed from below, the rear acceleration sensor 51 can be prevented from being hit by foreign matter coming from below during travel on a bad road. Additionally, since the rear acceleration sensor 51 is hidden by the guard member 55 when viewed from the front of the vehicle and when viewed in the vehicle width direction, the rear acceleration sensor 51 can be prevented from being hit by foreign matter coming from the front of the vehicle or coming in the vehicle width direction during travel on a bad road.

If the sub-harness WH2 or WH3 is broken, the sub-harness WH2 or WH3 can be replaced with a new one by cutting the connection made by the connector device C1 or C3 without having to replace the main harness WH1. This provides improved ease of maintenance. If the acceleration sensor 41 or 51 fails to function properly, the acceleration sensor 41 or 51 can be replaced with a new one by detaching the guard member 55 and cutting the connection made by the connector device C2 or C4 without having to replace the wire harness WH. This provides improved ease of maintenance.

Additionally, since the electronic control unit 61 controls the suspension devices 13 and 14 with reference to both the acceleration of the vehicle body frame 2 and the acceleration of the below-shock absorber member (upper A-arm 31/trailing arm 33), the control can be performed with improved responsiveness and accuracy. For example, the electronic control unit 61 can exhibit improved control responsiveness by suspension control based on the acceleration of the below-shock absorber member and can exhibit improved control accuracy by suspension control based on the acceleration of the vehicle body frame 2.

Many modifications and other embodiments of the present invention will be apparent to those skilled in the art from the foregoing description. Accordingly, the foregoing description is to be construed as illustrative only, and is provided for the purpose of teaching those skilled in the art the best mode for carrying out the invention. The details of the structure and/or function may be varied substantially without departing from the scope of the invention.

What is claimed is:

1. A utility vehicle comprising:
    a wheel;
    a vehicle body frame supported by the wheel;
    a suspension device connecting the wheel to the vehicle body frame; and
    an acceleration sensor mounted on the suspension device, wherein
    the suspension device comprises: a below-shock absorber member comprising an arm mechanism swingably connecting the wheel to the vehicle body frame; and a shock absorber connecting the below-shock absorber member to the vehicle body frame, and
    the acceleration sensor is mounted on a rear side of the arm mechanism, and is hidden by the arm mechanism when viewed from the front of the vehicle.

2. The utility vehicle according to claim 1, wherein the acceleration sensor is disposed on an upper side of the arm mechanism, and is hidden by the arm mechanism when viewed from below.

3. The utility vehicle according to claim 1, further comprising a wire harness electrically connected to the acceleration sensor, wherein
    the wire harness comprises a main harness attached to the vehicle body frame and a sub-harness electrically connecting the main harness to the acceleration sensor, and
    the sub-harness is laid along an upper surface of the arm mechanism and extends from a front end of the arm mechanism toward the acceleration sensor, the front end being connected to the vehicle body frame in such a manner that the arm mechanism is pivotable relative to the vehicle body frame.

4. The utility vehicle according to claim 1, further comprising:
    a wire harness electrically connected to the acceleration sensor; and
    a connector device connecting the wire harness to the acceleration sensor.

5. The utility vehicle according to claim 1, further comprising an electronic control unit to which a detection signal of the acceleration sensor is input, wherein
    the suspension device is an electronically controlled suspension device, and
    the electronic control unit controls the electronically controlled suspension device based on the detection signal of the acceleration sensor.

6. A utility vehicle comprising:
    a wheel;
    a vehicle body frame supported by the wheel;
    a suspension device connecting the wheel to the vehicle body frame; and
    an acceleration sensor mounted on the suspension device, wherein
    the suspension device comprises: a below-shock absorber member comprising an arm mechanism swingably connecting the wheel to the vehicle body frame; and a shock absorber connecting the below-shock absorber member to the vehicle body frame,
    the arm mechanism comprises an upper arm and a lower arm, and
    the acceleration sensor is secured to the upper arm.

7. The utility vehicle according to claim 6, wherein the acceleration sensor is disposed on a rear side of the upper arm, and is hidden by the upper arm when viewed from the front of the vehicle.

8. A utility vehicle comprising:
    a wheel;
    a vehicle body frame supported by the wheel;
    a suspension device connecting the wheel to the vehicle body frame; and
    an acceleration sensor mounted on the suspension device, wherein
    the suspension device comprises: a below-shock absorber member comprising an arm mechanism swingably connecting the wheel to the vehicle body frame; and a shock absorber connecting the below-shock absorber member to the vehicle body frame,
    the arm mechanism comprises a trailing arm extending in a front-rear direction,
    the acceleration sensor is secured to the trailing arm, and
    the acceleration sensor is disposed on an upper side of the trailing arm, and is hidden by the trailing arm when viewed from below.

9. The utility vehicle according to claim 8, further comprising a guard member secured to the trailing arm and covering a front side of the shock absorber, wherein
    the acceleration sensor is hidden by the guard member when viewed from the front of the vehicle and when viewed in a vehicle width direction.

10. A utility vehicle comprising:
    a wheel;
    a vehicle body frame supported by the wheel;
    a suspension device connecting the wheel to the vehicle body frame;
    an acceleration sensor mounted on the suspension device; and
    a wire harness electrically connected to the acceleration sensor, wherein
    the wire harness comprises a main harness attached to the vehicle body frame, a sub-harness electrically connecting the main harness to the acceleration sensor, and a connector device detachably connecting the sub-harness to the main harness,
    the suspension device comprises: a below-shock absorber member comprising an arm mechanism swingably connecting the wheel to the vehicle body frame; and a shock absorber connecting the below-shock absorber member to the vehicle body frame, and
    the acceleration sensor is mounted on the arm mechanism.

* * * * *